(12) United States Patent
Weiner

(10) Patent No.: US 10,784,969 B2
(45) Date of Patent: Sep. 22, 2020

(54) SECURED FIBER LINK SYSTEM

(71) Applicant: APRIORI NETWORK SYSTEMS, LLC., Bedminster, NJ (US)

(72) Inventor: Gary M. Weiner, Bedminster, NJ (US)

(73) Assignee: APRIORI NETWORK SYSTEMS, LLC., Bedminster, NJ (US)

( * ) Notice: Subject to any disclaimer, the term of this patent is extended or adjusted under 35 U.S.C. 154(b) by 0 days.

(21) Appl. No.: 16/190,801

(22) Filed: Nov. 14, 2018

(65) Prior Publication Data

US 2019/0081709 A1     Mar. 14, 2019

Related U.S. Application Data

(63) Continuation-in-part of application No. 15/822,909, filed on Nov. 27, 2017, and a continuation-in-part of application No. 15/435,619, filed on Feb. 17, 2017, now Pat. No. 10,284,288, said application No. 15/822,909 is a continuation-in-part of application
(Continued)

(51) Int. Cl.
| H04B 10/00 | (2013.01) |
| H04B 10/85 | (2013.01) |
| H04B 10/25 | (2013.01) |
| H04B 10/071 | (2013.01) |

(52) U.S. Cl.
CPC .......... H04B 10/85 (2013.01); H04B 10/071 (2013.01); H04B 10/25 (2013.01)

(58) Field of Classification Search
CPC .................................................... H04B 10/85
See application file for complete search history.

(56) References Cited

U.S. PATENT DOCUMENTS

| 4,000,416 A | 12/1976 | Goell |
| 4,062,618 A | 12/1977 | Steensma |
| 4,134,642 A | 1/1979 | Kapron et al. |

(Continued)

FOREIGN PATENT DOCUMENTS

WO     2018027267 A1     2/2018

OTHER PUBLICATIONS

"Risks and Dangers of Fibre Optic Cables", InfoGuard AG, Switzerland, pp. 1-9.
(Continued)

*Primary Examiner* — David C Payne
*Assistant Examiner* — Pranesh K Barua
(74) *Attorney, Agent, or Firm* — M&B IP Analysts, LLC

(57) ABSTRACT

A system and method for securing communication over an optical fiber are disclosed. The system includes a transmit spatial multiplexer configured to couple optical signals into spatial paths of an optical fiber, a first of the plurality of optical signals is an optically modulated version of a desired sequence of information that is intended to be transferred over the optical fiber and it is coupled into a first of the spatial paths; a second one of the plurality of optical signals is an optical chaff signal and it is coupled into a second spatial path different from the first one, and a third optical signal is an optical signal for use by an optical time domain reflectometer (OTDR) that is coupled into one of the spatial paths of the optical fiber, whereby a tap along the fiber cannot determine the transmitted desired sequence of information.

36 Claims, 5 Drawing Sheets

Related U.S. Application Data

No. 15/435,619, filed on Feb. 17, 2017, now Pat. No. 10,284,288.

(60) Provisional application No. 62/427,186, filed on Nov. 29, 2016, provisional application No. 62/301,892, filed on Mar. 1, 2016, provisional application No. 62/296,897, filed on Feb. 18, 2016.

(56) References Cited

U.S. PATENT DOCUMENTS

| | | | |
|---|---|---|---|
| 4,217,488 A * | 8/1980 | Hubbard | G02B 6/4469 398/142 |
| 4,436,368 A * | 3/1984 | Keck | G02B 6/4469 340/555 |
| 4,973,169 A * | 11/1990 | Slonecker | G02B 6/274 385/1 |
| 5,140,636 A | 8/1992 | Klbares | |
| 5,166,821 A | 11/1992 | Huber | |
| 5,448,059 A * | 9/1995 | Blank | G01M 11/319 250/227.14 |
| 5,455,698 A | 10/1995 | Udd | |
| 5,559,623 A * | 9/1996 | Einarsson | H04B 10/85 340/555 |
| 5,694,408 A | 12/1997 | Bott et al. | |
| 5,712,937 A * | 1/1998 | Asawa | G02B 6/12007 385/12 |
| 5,757,912 A * | 5/1998 | Blow | H04L 9/0858 380/256 |
| 6,160,614 A * | 12/2000 | Unno | G01M 11/3136 356/73.1 |
| 6,246,500 B1 * | 6/2001 | Ackerman | H04B 10/505 398/115 |
| 6,342,965 B1 * | 1/2002 | Kinoshita | H01S 3/06754 359/334 |
| 6,801,700 B2 * | 10/2004 | MacChesney | G02B 6/02 385/101 |
| 6,850,712 B1 * | 2/2005 | Delavaux | H04B 10/2537 398/183 |
| 7,327,914 B1 | 2/2008 | Kahn et al. | |
| 7,596,322 B2 * | 9/2009 | Tomaru | H04L 9/0662 380/255 |
| 7,613,396 B2 * | 11/2009 | Maeda | H04B 10/70 380/255 |
| 7,639,909 B2 | 12/2009 | Murshid et al. | |
| 8,184,989 B2 * | 5/2012 | Maeda | H04L 9/0852 380/256 |
| 8,538,272 B1 * | 9/2013 | Robinson | H04B 10/2513 398/158 |
| 8,644,362 B1 * | 2/2014 | Lauer | H04J 13/0018 375/141 |
| 8,798,455 B2 | 8/2014 | Frankel | |
| 9,007,681 B2 | 4/2015 | Zhu | |
| 9,008,507 B2 * | 4/2015 | Winzer | H04B 10/2581 398/26 |
| 9,766,407 B2 | 9/2017 | Weiner et al. | |
| 9,857,536 B2 | 1/2018 | Kopp et al. | |
| 2001/0024307 A1 | 9/2001 | Franco et al. | |
| 2002/0024691 A1 * | 2/2002 | Kajita | H04B 10/079 398/9 |
| 2002/0025041 A1 * | 2/2002 | Tomita | H04L 9/0662 380/256 |
| 2002/0085716 A1 * | 7/2002 | Abdulkader | H04K 1/02 380/205 |
| 2002/0191415 A1 * | 12/2002 | Takei | H01S 3/067 362/551 |
| 2003/0007215 A1 * | 1/2003 | Snawerdt | H04B 10/071 398/139 |
| 2003/0128982 A1 * | 7/2003 | Glingener | H04B 10/532 398/65 |
| 2004/0156643 A1 | 8/2004 | Frederiksen et al. | |
| 2004/0184820 A1 * | 9/2004 | Ohishi | H01S 3/06795 398/200 |
| 2004/0208208 A1 * | 10/2004 | Shin | H01S 5/4006 372/32 |
| 2005/0105728 A1 * | 5/2005 | Yamaoka | G06F 21/10 380/202 |
| 2005/0244165 A1 | 11/2005 | Hofmeister | |
| 2005/0265727 A1 * | 12/2005 | Glingener | H04J 14/06 398/152 |
| 2006/0045525 A1 * | 3/2006 | Lee | H04B 10/25752 398/71 |
| 2006/0093376 A1 * | 5/2006 | Mitchell | H04B 10/70 398/183 |
| 2006/0115086 A1 * | 6/2006 | Beausoleil | G06F 7/588 380/263 |
| 2006/0188262 A1 * | 8/2006 | Suematsu | H04B 10/077 398/147 |
| 2007/0065155 A1 * | 3/2007 | Luo | H04B 10/70 398/141 |
| 2007/0285764 A1 * | 12/2007 | Sugliani | H01S 3/302 359/334 |
| 2008/0025511 A1 * | 1/2008 | Fuse | H04K 1/02 380/256 |
| 2008/0031637 A1 * | 2/2008 | Tomaru | H04B 10/548 398/188 |
| 2008/0310858 A1 * | 12/2008 | Lu | H04B 10/296 398/158 |
| 2009/0016736 A1 * | 1/2009 | Beal | H04L 9/0852 398/144 |
| 2010/0028008 A1 * | 2/2010 | Nakajima | H04B 10/07955 398/83 |
| 2010/0040380 A1 * | 2/2010 | Lewin | G06E 3/00 398/158 |
| 2010/0329671 A1 | 12/2010 | Ryf et al. | |
| 2010/0329693 A1 * | 12/2010 | Chen | H04B 10/85 398/147 |
| 2011/0076020 A1 * | 3/2011 | Nilsson | H04B 10/0775 398/65 |
| 2011/0170858 A1 | 7/2011 | Aguren | |
| 2011/0274435 A1 | 11/2011 | Fini et al. | |
| 2011/0279888 A1 * | 11/2011 | Fini | G02B 6/2835 359/334 |
| 2012/0076301 A1 * | 3/2012 | Kanter | H04K 1/02 380/256 |
| 2012/0177065 A1 * | 7/2012 | Winzer | H04B 10/2581 370/480 |
| 2012/0207470 A1 * | 8/2012 | Djordjevic | H04B 10/25 398/44 |
| 2012/0263466 A1 | 10/2012 | Djordjevic et al. | |
| 2012/0294625 A1 * | 11/2012 | Dynes | H04L 7/0008 398/155 |
| 2012/0314867 A1 * | 12/2012 | Tomaru | H04L 9/08 380/270 |
| 2013/0063809 A1 | 3/2013 | Nishihara et al. | |
| 2013/0077967 A1 | 3/2013 | Woodward et al. | |
| 2013/0121693 A1 | 5/2013 | Tanaka et al. | |
| 2013/0148963 A1 | 6/2013 | Cvijetic et al. | |
| 2013/0202292 A1 * | 8/2013 | Sokolov | H04B 10/807 398/34 |
| 2013/0236175 A1 | 9/2013 | Sethumadhavan et al. | |
| 2013/0308951 A1 * | 11/2013 | Blumenthal | H04J 14/02 398/83 |
| 2014/0003807 A1 * | 1/2014 | Hamaguchi | H04B 10/0795 398/29 |
| 2014/0079395 A1 * | 3/2014 | Effenberger | H04B 10/2537 398/66 |
| 2014/0153922 A1 | 6/2014 | Ryf et al. | |
| 2014/0168756 A1 | 6/2014 | Zhu | |
| 2014/0186033 A1 * | 7/2014 | Winzer | H04B 10/2581 398/39 |
| 2014/0294345 A1 | 10/2014 | Kopp et al. | |
| 2014/0307304 A1 | 10/2014 | Zhu | |
| 2014/0348506 A1 * | 11/2014 | Nakamoto | H04J 14/0224 398/65 |
| 2015/0117511 A1 * | 4/2015 | Lyubomirsky | H04L 25/03057 375/233 |
| 2015/0304051 A1 * | 10/2015 | Yuan | H04B 10/70 398/188 |

(56) References Cited

U.S. PATENT DOCUMENTS

| | | | |
|---|---|---|---|
| 2015/0372763 A1* | 12/2015 | Wang | H04B 10/58 398/81 |
| 2016/0018245 A1* | 1/2016 | Yamate | G02B 6/02042 250/227.14 |
| 2016/0036531 A1* | 2/2016 | Babic | H01S 5/041 398/187 |
| 2016/0056889 A1* | 2/2016 | Le Taillandier De Gabory | H04L 25/14 398/16 |
| 2016/0112119 A1* | 4/2016 | Vall-Llosera | H04B 10/40 398/21 |
| 2016/0127073 A1* | 5/2016 | Ashrafi | H04B 10/516 398/44 |
| 2017/0026175 A1* | 1/2017 | Zhang | H04L 9/0852 |
| 2017/0104543 A1* | 4/2017 | Taylor | H04B 10/516 |
| 2017/0279554 A1* | 9/2017 | Lin | H04B 10/2503 |
| 2018/0159619 A1 | 6/2018 | Weiner | |
| 2018/0259737 A1* | 9/2018 | Lee | G02B 6/0219 |
| 2020/0083659 A1 | 3/2020 | Reeves-Hall et al. | |

OTHER PUBLICATIONS

"Secure High-Speed Connectivity", Adva Optical Networking, Version Jul. 2015, pp. 1-6.
"Wavelogic Encryption Solution", ciena: the network specialist, Nov. 2015, pp. 1-5.
Almeshekah, "Using Deception to Enhance Security: A Taxonomy, Model, and Novel Uses," A Dissertation Submitted to the Faculty of Purdue University, West Lafayette, Indiana, Aug. 2015, pp. 1-171.
Barbosa, et al., "Untappable Key Distribution System: a One-Time-Pad Booster", Jul. 2015, pp. 1-13.
Deloitte, "Tapping of Fibre Networks", 2017, Deloitte Touche Tohmatsu Limited, pp. 1-10.
Dickson, "Secure Pipes: Changing the Expectation of Your Internet Service Providers", Jan. 2015, Copyright Frost & Sullivan, California, pp. 1-8.
Hayashi, et al., "125-um-Cladding 8-Core Multi-Core Fiber Realizing Ultra-High-Density Cable Suitable for O-Band Short-Reach Optical Interconnects", Sumitomo Electric Industries, Ltd.,Th5C.6. pdf, OFC Postdeadline Papers copyright OSA 2015, Japan, pp. 1-3.
Hinderthur, "Layer 1 Encryption in WDM Transport Systems", Slideshow for ADVA Optical Networking, 2014, URL: https://www.slideshare.net/ADVAOpticalNetworking/layer-1-encryption-wdm-transport-systems.
IBM Analytics, White Paper, "The Awakening of Cyber-Threat Analysis: An Intelligence-Driven Solution to Security and Risk", IBM Corporation, Somers, NY, Copyright IBM Corporation 2015, pp. 1-20.
ID Quantique SA, "Securing Your Data in Transit for the Long Term", Switzerland, 2014, pp. 1-39.
ID Quantique White Paper, "Fibre Optic Networks: Your Weakest Link?", Version 1.0, Mar. 2011, Switzerland, pp. 1-9.
Kaminow, et al., "Optical Fiber Telecommunications: Systems and Networks", 2013, Academic Press, Sixth Edition, pp. 460-461.
Kopp, et al., "Pitch Reducing Optical Fiber Array and Multicore Fiber for Space-Division Multiplexing", IEEE, 2013, TuC2.2 (Contributed), pp. 99-100.
Lalli, et al., "Modernized Intrusion Detection Using Enhanced Apriori Algorithm", International Journal of Wireless & Mobile Networks (IJWMN) vol. 5, No. 2, Apr. 2013, pp. 71-80.
Modi, et. al., "Integrating Signature Apriori Based Network Intrusion Detection System (NIDS) in Cloud Computing", 2nd International Conference on Communication, Computing & Security (ICCCS-2012), pp. 905-912.
Network Integrity Systems, Inc., "Enhancing the Deployment and Security of SIPRNET and JWICS Networks Using Intrinsic Fiber Monitoring", Conover, NC, Communications Supply Corporation, Clarksburg, MD, 2007, pp. 1-40.
Office of the Secretary of Defense (OSD), Office of Small Business Programs (OSBP), 18.1 Small Business Innovation Research (SBIR), Proposal Submission Instructions, pp. 1-8.
Oyster Optics, Inc., "Securing Fiber Optic Communications against Optical Tapping Methods", Copyright 2002-2003 Oyster Optics, Inc., New York, pp. 1-20.
Richardson, et al., "Space Division Multiplexing in Optical Fibres", Southampton, UK, pp. 1-19.
Ritter, "Network Encryption", Adva Optical Networking, Sep. 2015, pp. 1-36.
Rozario, "Secure Communication Over Fiber Optic Networks", D Y Patil School of Engg. & Technology, India, Mar. 2016, pp. 1-27.
Simpson, "Advanced Alarmed PDS Technology", Network Integrity Systems, WESCO Distribution, Inc., Pittsburgh, PA., pp. 1-8.
Umoh, et al., "The Vulnerability of Fiber-Optics Communication Systems: The Role of Optical Tapping", Journal of Information Engineering and Applications, ISSN 2224-5782 (print) ISSN 2225-0506 (online) vol. 4, No. 4, 2014, Nigeria, pp. 145-153.
Wu, et al., "Secure Communication in Fiber-Optic Networks", Chapter 11, Princeton, NJ, 2014, pp. 173-183. Emerging Trends in ICT Security. DOI: http://dx.doi.org/10.1016/B978-0-12-411474-6.00011-6.
The International Search Report and the Written Opinion of the International Searching Authority for PCT/US2019/060465, ISA/RU, Moscow, Russia.

* cited by examiner

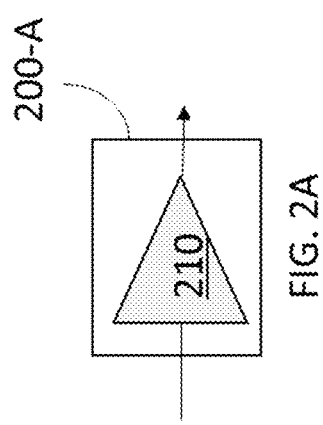
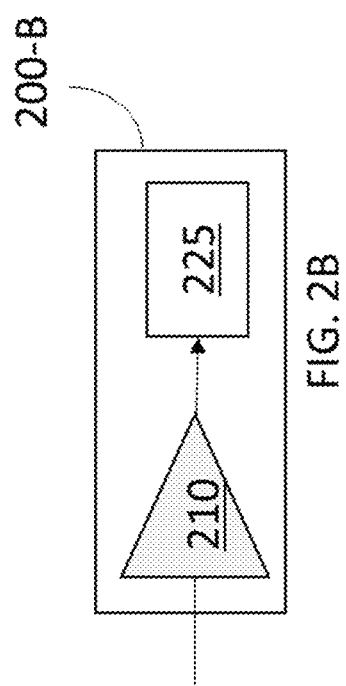

SECURED FIBER LINK SYSTEM

CROSS-REFERENCE TO RELATED APPLICATIONS

This application is a continuation-in-part of U.S. patent application Ser. No. 15/435,619 filed Feb. 17, 2017, which, claims the benefit of U.S. provisional application No. of U.S. provisional application No. 62/296,897 filed on Feb. 18, 2016 and of U.S. provisional application No. 62/301,892, filed on Mar. 1, 2016. This application is also a continuation-in-part of U.S. patent application Ser. No. 15/822,909 filed on Nov. 27, 2017, which claims the benefit of U.S. provisional application No. 62/427,186, filed on Nov. 29, 2016 and is a continuation-in-part of aforementioned U.S. patent application Ser. No. 15/435,619 which claims the benefit of U.S. provisional application 62/296,897 filed on Feb. 18, 2016 and of U.S. provisional application No. 62/301,892, filed on Mar. 1, 2016. The contents of each of the above-referenced applications are incorporated herein by reference.

TECHNICAL FIELD

The present disclosure relates generally to optical fiber cables, and more particularly to detecting and preventing tapping of optical fiber cables.

BACKGROUND

Intruders can tap into optical fiber transmission lines and steal information by either bending a segment or segments of the fiber or by stretching, e.g., tapering, a segment or segments of the fiber via application of heat. Doing so may enable reading and interpreting the signal energy escaping from the bent or stretched fiber. While there are other methods of tapping information out of optical fibers, taps based on fiber bending or stretching are easy to implement, effective, and can be hard to detect. Tapping valuable data transmitted over the world wide optical fiber infrastructure is a threat to every major industry and government organization and, in particular, to larger organizations utilizing multiple facilities. While these organizations may be able to secure optical fiber cables within their own facilities, they generally have much less control over the optical fiber cable links between those facilities.

The vulnerabilities of optical fibers to tapping and, in particular, to tapping by bending or stretching of the fiber, leaves many organizations susceptible to data theft. Such data theft could lead to leaking of confidential information, thereby causing harm to the entity whose data is being transported over such tapped optical fibers. In the business context, leaking of information, such as marketing strategies or developmental technologies, may ultimately result in damage to profits. In the governmental context, leaking of information related to national security may endanger the lives of citizens. Existing solutions are insufficient to detect or to prevent data extraction using tapping of optical fibers.

It is generally believed that data encryption can secure data transmitted over a fiber link. Such encryption is often implemented using the Advanced Encryption Standard (AES). However, this approach neglects the fact that while the data payload is encrypted, the IP header information that guides the data packets around the internet is not. Such headers reveal both the source and destination of each packet and, therefore, reveal information about any message sent over the internet.

An optical time domain reflectometer (OTDR) is a known tool for characterizing, monitoring, and troubleshooting a fiber. An OTDR typically operates by sending laser pulses of different widths and monitoring their refection as received at the pulse-transmitting end of the fiber. An OTDR can pinpoint the location of faults in a fiber link, and OTDRs find and characterize both reflective and non-reflective events in optical fiber. Thus, an OTDR can be used to detect a bend introduced in a fiber link after the fiber link is established by comparison with an earlier OTDR trace prior to the fiber having been bent, e.g., a trace made when the link is first installed. An OTDR can be used for testing an in-service fiber, i.e., one carrying data intended to be delivered to a destination, by running the test pulses on a different wavelength channel than the one used to carry the data intended for delivery.

Unfortunately, for highly secure government communications it is often preferred that an optical data signal not be modified by a transceiver. Such a preference, when made a requirement, means that the fiber carrying the secure communication cannot also carry the pulses required by the OTDR.

Also, as is known, the techniques used by an OTDR suffer from so-called "dead zones", which are areas after a reflective event takes place that cannot be seen by the OTDR. Such a dead zone often occurs for a large distance at the beginning of the fiber when trying to look at a very long length optical fiber. This is because when trying to look at a very long optical fiber, it is necessary to launch a lot of power to be able to see the conditions at the end of the fiber. When a lot of optical power is launched, the pulse width of the launched optical signal is increased. Use of a large pulse width decreases the resolution of the measurement that can be made by an OTDR the result of the reduced resolution can extend as far as several hundred meters. As a result, faults near the launch end are masked because of the hundreds of meters between the launch pulse and the receiver being able to see the reflected pulse.

If there is a fault near the launch point, it can also create large reflections that saturate and overload the receiver. This length of fiber is also called a "dead zone" because the faults are masked in the length close to the OTDR. The receiver requires an amount of time to recover from the saturation. Depending on the OTDR design, wavelength, and magnitude, the OTDR may take up to, for example, 500 meters or more to fully recover from such faults near the launch point.

Most OTDR manuals suggest the use of launch fibers external to the OTDR equipment to resolve these issues. Launch fibers are fibers of a prescribed length that are placed between the OTDR and the actual fiber that is being measured and thereby provides time for the receiver to settle and also for the pulse width dependent resolution to be overcome. When launch fibers are used, faults close to the end of the fiber being measured can be seen by the OTDR. They do not interfere with the actual fiber being measured and are a proven technique for identifying faults in the total length of fiber being tested from its first interface to its last. Such launch fibers are thus located on a spool or within a "launch box" in between the OTDR and the fiber under test so as to create the proper conditions for testing the optical fiber for faults.

Again, due to government preferences or requirements, oftentimes an additional signal should not be coupled onto the fiber carrying the secure data intended to be delivered to the destination and, furthermore, such launch fiber would be an additional insecure tampering point.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosed embodiments include a system for securing communication over an optical fiber. The system comprises a transmit spatial multiplexer configured to couple ones of a plurality of optical signals into ones of a plurality of spatial paths of an optical fiber, each of the spatial paths being able to carry an optical signal, wherein at least a first one of the plurality of optical signals is an optically modulated version of a desired sequence of information that is intended to be transferred over the optical fiber, the at least first one of the plurality of optical signals being coupled into a first one of the plurality of spatial paths; wherein at least a second one of the plurality of optical signals is an optical chaff signal, the at least second one of the plurality of optical signals being coupled into a second one of the plurality of spatial paths different from the first one; and wherein at least a third one of the plurality of optical signals is an optical signal for use by an optical time domain reflectometer (OTDR); whereby a tap along the fiber cannot determine the transmitted desired sequence of information.

The disclosed embodiments also include a method for securing information transmitted over an optical fiber having a plurality of spatial paths. The method comprises coupling each of a set of optical signals into at least one of the plurality of spatial paths; wherein at least one of the set of optical signals is an optically modulated version of a desired sequence of information that is intended to be transferred over the optical fiber, the at least first one of the plurality of optical signals being coupled into a first one of the plurality of spatial paths; wherein at least a second one of the set of optical signals is an optical chaff signal, the at least second one of the plurality of optical signals being coupled into a second one of the plurality of spatial paths different from the first one; and wherein at least a third one of the plurality of optical signals is an optical signal for use by an optical time domain reflectometer (OTDR).

The disclosed embodiments also include a terminal equipment for securing communication over an optical fiber. The terminal equipment comprises a transmit spatial multiplexer configured to couple a plurality of optical signals into respective ones of a plurality of spatial paths of an optical fiber, each of the spatial paths being able to carry an optical signal; wherein at least one of the plurality of optical signals is an optically modulated version of a desired sequence of information that is intended to be transferred over the optical fiber; and wherein at least one of the plurality of optical signals is an optical chaff signal multiplexed with an optical signal for use by an optical time domain reflectometer (OTDR); whereby a tap along the fiber cannot determine the transmitted desired sequence of information.

The disclosed embodiments also include a system for securing communication over an optical fiber. The system comprises a receive spatial demultiplexer couplable to a plurality of spatial paths of the optical fiber at one end thereof, at least two spatial paths of the plurality of spatial paths carrying optical signals; wherein an optical signal on a first of the at least two spatial paths includes at least an optically modulated version of a desired sequence of information that is intended to be received from the optical fiber; wherein an optical signal on a second of the at least two spatial paths different from the first of the at least two spatial paths includes an optical chaff signal; and wherein the receive spatial demultiplexer is configured to receive from at least one of the plurality of spatial paths a signal for use by an optical time domain reflectometer (OTDR) and to supply the received signal for use by an OTDR to an OTDR.

BRIEF DESCRIPTION OF THE DRAWINGS

FIGS. 2A, 2B and 2C are block diagrams of illustrative embodiments of chaff sources using amplified spontaneous emission (ASE);

DETAILED DESCRIPTION

Figure 1:
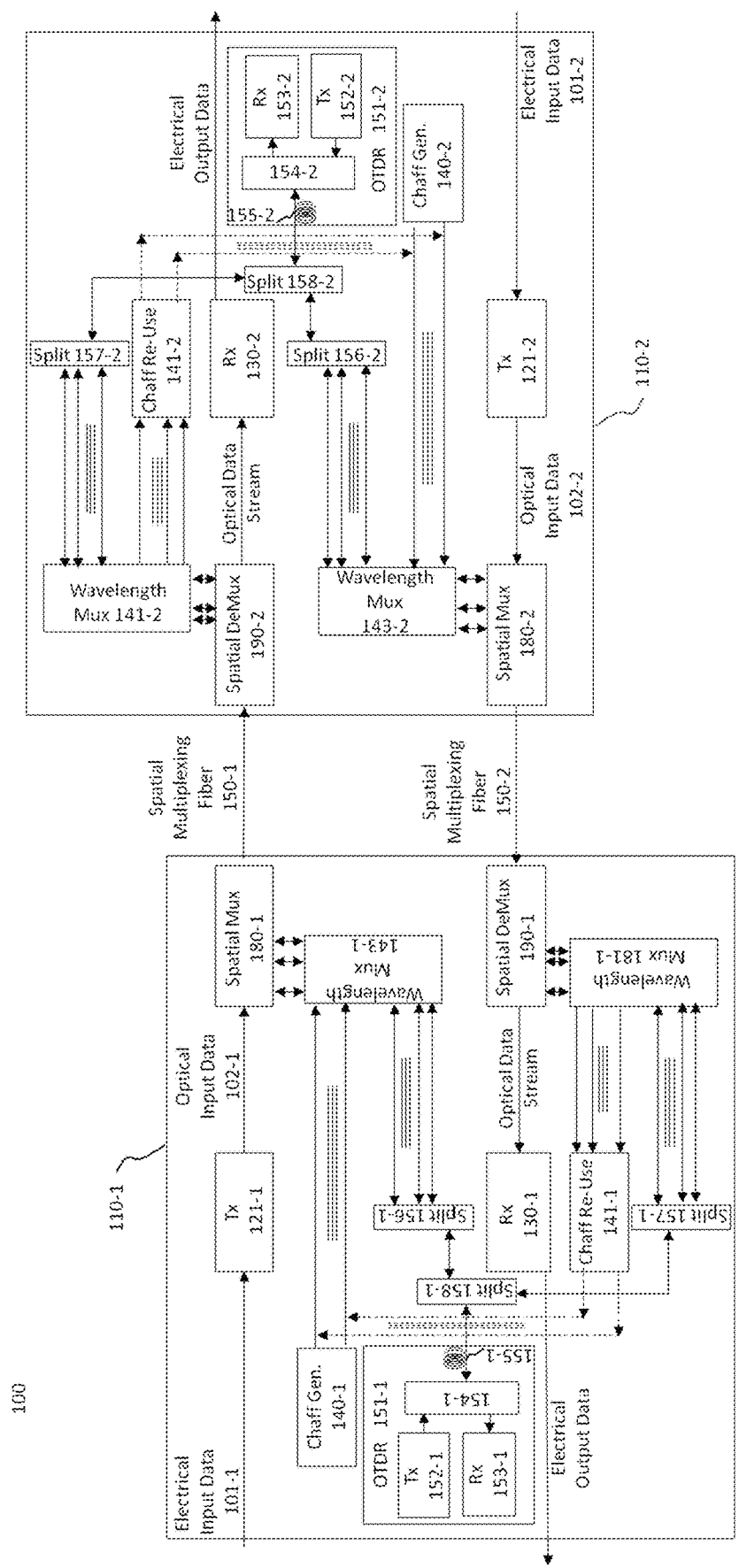
FIG. 1 is a block diagram of a secured fiber link system according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The terms "true signal", "true data", "information signal", "true data signal" and "data signal" are used interchangeably to refer to a desired sequence of information that is intended to be transferred between legitimate users at the ends of a link. A chaff signal is a signal that does not carry true data.

In an embodiment, the secured fiber link system is configured to allow transmission of data to the intended user while simultaneously making the signal opaque or uninterpretable to a tapper who makes a tap anywhere along the entire link other than at the intended receiver by overwhelming the information signal with interfering signal energy at such tapping point and also enabling detection of tapping, moving, or similar such interference with the optical cable through the use of an optical time domain reflectometer (OTDR).

To this end, the secured fiber link system sends on a first spatial path of a fiber cable, e.g., a core of a multicore fiber, a desired sequence of information in the form of a first "legitimate" or true signal, or a set of true signals, that is typically intended to be transferred between legitimate users located at the ends of a link. Also, at least one other spatial path of the fiber cable, e.g., a different core of the multicore fiber, carries a chaff signal and at least one spatial path carries a signal that can be monitored by an OTDR to detect changes in those signals that can result from the act of tapping the fiber. The OTDR signal may be carried on a dedicated core or may be wavelength multiplexed with either one or more true signals or with one or more chaff signals. This enables detection of tapping or tampering at the terminals of the fiber optic link system.

Chaff signals, which are interfering signals not needed for conveying the true signal, may be applied to the link at one or both ends of the link. Similarly, OTDR signals may be applied at one or both ends of the link.

In an embodiment, the secured fiber link system is configured to provide physical security of a data signal propagating over at least one of a plurality of spatial paths of an optical fiber in parallel with at least one chaff signal propagating over another of the plurality of spatial paths of the optical fiber, in combination with, e.g., multiplexed with, such as using frequency division multiplexing, a signal for use by the OTDR at least some of the time.

In embodiments that employ multiple spatial paths to each carry a respective chaff signal, more than one of the spatial paths that carry a chaff signal may carry a multiplexed OTDR signal. In such embodiments an OTDR signal may be carried continuously on one or more of the spatial paths carrying chaff signals or an OTDR signal may be time multiplexed amongst the various spatial paths carrying chaff signals, or a combination of both may be employed.

In embodiments of the disclosure, the spatial paths carrying the data signal and the chaff signals may be cores of a multicore fiber.

The system is configured to ensure that the intended recipient at the other end of the link receives the true data.

As indicated above, tapping of a fiber link may be an act of changing a fiber such as by putting physical force on a fiber cable, e.g., by bending the fiber, or by modifying the fiber, e.g., applying heat to allow a segment or segments of the fiber to be axially stretched but without breaking the fiber. Such techniques causes the energy propagating within the fiber to leak out therefrom so that it may be detected, e.g., a hacker attempting to steal the information that is being transmitted on the cable.

Embodiments of the secured fiber link system may be compatible with contemporary data rates, formats, and telecommunications protocols, as well as signal wavelength provisioning, such as wavelength division multiplexing (WDM). The disclosed embodiments may also be agnostic to equipment and protocols developed in the future.

FIG. 1 shows a block diagram of an illustrative secured fiber link system 100 according to an embodiment. System 100 includes transceiver terminals 110-1 and 110-2 connected via an optical link, e.g., optical fibers 150-1 and 150-2, each of which may be, for example, a multicore fiber, a multimode fiber or a few mode fiber, which preferably allow for spatial division multiplexing. Note that optical fibers 150-1 and 150-2, although shown as separate fibers for explanatory purposes, may be implemented as different spatial paths that are part of the same physical optical fiber. As such, they may, for example, represent different optical cores within a multicore fiber.

Each terminal 110-1 or 110-2, collectively terminals 110, may each include at least one transmitter, e.g., transmitters 121-1 or 121-2, at least one receiver, e.g., receivers 130-1 or 130-2, at least one chaff generator, e.g., chaff generators 140-1 or 140-2, and at least one OTDR, e.g., OTDR 151-1 or 151-2. For clarity and pedagogical purposes, but without limitation, FIG. 1 will be discussed herein below with respect to various optical signals being transmitted from the terminal 110-1 and being received at terminal 110-2. However, as will be readily recognized by one of ordinary skill in the art, such optical signals may be similarly transmitted from terminal 110-2 and received at terminal 110-1 without departing from the disclosed embodiments. Therefore, unless specifically indicated otherwise, it should be appreciated that any description with regard to any particular component of terminal 110-1 applies, mutatis mutandis, to its counterpart and similarly designated component of terminal 110-2, and vice-versa. Note to that not every feature shown for terminals 110 need be implemented in every embodiment of a terminal and that other embodiments may include other features not shown in FIG. 1.

FIG. 1 shows an embodiment in which terminal 110-1 is supplied with electrical input data signal 101-1, and in particular, electrical input data signal 101-1 is received at transmitter 121-1. Electrical input data signal 101-1 is converted into optical input data signal 102-1 by transmitter 121-1 which acts as optical-electronic-optical (OEO) converter. In other embodiments of the invention, instead of an electrical input data signal 101-1 being supplied to terminal 110-1 and being converted by transmitter 121-1 into optical input data signal 102-1, optical input data signal 102-1 may be directly supplied to terminal 110-1 as the input data source, i.e., as the true signal, and will, in particular, be supplied to spatial multiplexer 180-1. In such an embodiment, the optical input data signal 102-1, e.g., per a requirement or preference, will not be modified by terminal 110-1, and hence transmitter 121-1 will not be employed.

Terminal 110-1 transmits and receives signals via optical fibers 150-1 and 150-2, respectively. In an embodiment, chaff signals, which are signals used as explained herein to cause interference at a tap with respect to the true signals, are generated within the terminal 110-1 and are transmitted via the optical fiber 150-1 along with the true optical input data signal 102-1 as described above. Within terminal 110-1, a chaff signal may be generated by chaff generator 140-1, or a chaff signal received from terminal 110-2 via fiber 150-2 may be re-used for propagation along optical fiber 150-1. In this latter case, the output connections of chaff re-use module 141-1 take the place of the output connections of chaff generator 140-1 which are shown as dashed lines in FIG. 1. While those of ordinary skill in the art may employ any arrangement for generating a suitable chaff signal, illustrative chaff generators that may be employed as chaff generators 140-1 or 140-2 are shown in FIG. 2 and described further hereinbelow.

In accordance with the principles of the disclosure, an OTDR, e.g., OTDR 151-1 within terminal 110-1, generates a signal for use in detecting issues with the one of optical fibers 150 to which it is coupled, e.g., optical fiber 150-1, and the location of such issues. One such issue may be a tap. Thus, OTDR may pinpoint the location of a tap. The OTDR signal may be transmitted via one of transmitters 152, e.g., transmitter 152-1 which is typically incorporated within OTDR 151-1.

Also typically incorporated within an OTDR, e.g., OTDR 151-1, is a receiver and signal processor 153, e.g., receiver and signal processor 153-1 and a coupler 154, e.g., coupler 154-1. Coupler 154-1 is typically arranged such that in a first direction it couples the signal from transmitter 152-1 to a launch cable 155, e.g., launch cable 155-1, while in a second direction it couples signal received from launch cable 155-1 to receiver and signal processor 153-1. In the second direction coupler 155-1 may also act as a filter to block reflections of the chaff signal.

Transmitter 152-1 is typically a high power laser transmitter that transmits a pulse of light to be sent down one of optical fibers 150. Back-scattered light and reflected light return to each OTDR 151 from one of optical fibers 150. In terminal 110-1 such back-scattered light and reflected light are directed to receiver and signal processor 153-1 by coupler 154-1. The OTDR signal from transmitter 152-1 may be split or directed by splitter 158 and then further split or directed by splitters 156-1 or 157-1 to enable substantially simultaneous launching of copies of the same OTDR signal into multiple spatial paths of optical fibers 150. Doing so is useful as it is typically not required to identify which particular one of the fiber paths, e.g., which particular one of the cores of a multi-core fiber, is affected by tapping or tampering. The various splitters may, but need not, be passive splitters.

Alternatively, splitters 156-1 or 157-1 may be replaced by switches that can successively route OTDR pulses to different ones of the spatial paths and direct their corresponding reflections to receiver 153-1.

While chaff signals and data signal are typically configured to propagate in the same direction within respective ones of fibers 150, OTDR launch cable 155-1 may be coupled to either fiber 150-1 or 150-2 or to both simultaneously via either spatial or wavelength multiplexers or both. In particular, the OTDR signal supplied by OTDR 151-1 may be wavelength multiplexed with one or more true data signals, one or more chaff signals, any desired combination of true data signals and chaff signal, or may be supplied to its own spatial path without being multiplexed with any other signal. Of these various possibilities, FIG. 1 shows the case where the signal from OTDR launch cable 155-1 is split using splitter 158-1 to eventually be supplied to both fibers 150-1 and 150-2 via wavelength multiplexing with the chaff signals in wavelength multiplexers 143-1 and 143-2, followed by spatial multiplexing in spatial multiplexers 180-1 and 181-1.

In an embodiment, optical fibers 150-1 and 150-2 may be structured as multicore cables. Each core of a multicore fiber may be capable of independently guiding a light signal along the entire length of the multicore fiber. The individual cores may be single mode or multimode at the signal wavelengths transmitted.

In one embodiment, the combined optical chaff signal and OTDR signal are supplied to at least one spatial path of optical fiber 150-1, e.g., one core thereof when optical fiber 150-1 is a multicore fiber, while the true signal is supplied to a different spatial path of optical fiber 150-1.

In an embodiment, instead of OTDR 151-2 detecting interference with optical fiber 150-2, e.g., a tap, as well as possibly the location thereof, through the use of back-scattered light and reflected light, a device in terminal 110-1, e.g., an OTDR-type device such as OTDR 151-1, may be used to determine that there is interference with the optical fiber 150-2. This may be achieved through the use of optional splitter 157-1. For example, splitter 157-1 can duplicate an OTDR signal supplied by OTDR 151-1 of terminal 110-1 and supply it to fiber 150-2 attached to terminal 110-1. The reflection of the OTDR signal from optical fiber 150-2 is then processed, e.g., by receiver and signal processor 153-1. Similarly, for example, splitter 157-2 can duplicate an OTDR signal supplied by OTDR 151-2 of terminal 110-2 and supply it to fiber 150-1 attached to terminal 110-2 for processing, e.g., by receiver and signal processor 153-2.

In another embodiment of the disclosure, detecting interference with optical fiber 150-1 may be by a combined effort of OTDR 151-1 and an OTDR-type device, e.g., OTDR 151-2, in terminal 110-2.

In an embodiment, at least one chaff signal which is multiplexed with the OTDR signal, as well as the at least one data signal, are coupled into respective cores, or channels, of the optical fiber at the transmitter end.

The true data and the chaff signals, whether combined with the OTDR signal or not, are coupled into ones the individual channels of one of optical fibers 150, e.g., the individual cores of optical fibers 150 when optical fibers 150 are a multicore fiber, using respective couplers. Couplers for use in embodiments of the invention may be, for example, 1) a lensed fiber based coupler, 2) a tapered glass fiber coupler, 3) a free space bulk optics coupler, or 4) any other known or developed coupler. The couplers may also include fiber and free space paths. Collectively these couplers amount to a transmit spatial multiplexer, e.g., one of transmit spatial multiplexers 180-1 and 180-2, in that they couple a plurality of optical signals into respective ones of a plurality of spatial paths of one of optical fibers 150.

The true data signal or any chaff signal desired to be extracted, e.g., for use as described hereinbelow, may be obtained similarly, e.g., by using a receive spatial demultiplexer, such as one of spatial demultiplexers 190-1 and 190-2, which can be made up of individual decouplers. Such decouplers may be a coupler operating in reverse for this purpose or may be of any other known or developed decoupler. Such couplers may be operated bidirectionally so as to also couple signals into the one of optical fibers 150 to which they are coupled. Alternatively, the fiber core carrying the true data signal may simply be extended alone into the receiver.

In an embodiment, the generated chaff signals are uncorrelated with the true data signals. The bandwidth of chaff signals may be at least as wide as the bandwidth used for the true data signals. Further, the chaff signal may be arranged to be of sufficient optical strength to reduce the optical signal-to-noise-ratio (OSNR), or equivalently raise the bit error rate (BER), that would be observed by a tapper at a tap placed at any location along one of optical fibers 150 to a level such that the information obtained by the tapper is un-interpretable, e.g., the information that is carried in the data signals cannot be recovered at the tap.

At the receiver only the true signal need be recovered. To that end, only the core carrying the true signal may be coupled into receiver 130-2, which may include an optical to electrical converter, e.g., one or more photodiodes. In another embodiment, the true signal may be passed on for further processing in optical form. Advantageously, at the receiver ends of multicore fiber 150-1 and 150-2 the intended recipient will be able to obtain the data carried by the true signals regardless of the chaff signals.

The OTDR signals may be available at the one or both ends of the optical fiber to detect tampering with the optical fiber, e.g., to detect a tap and the location thereof.

The properties of the chaff signal thus provides protection for the optical fiber from tampering. Such properties, discussed in more detail below, prevent separating the true data signal from the resulting combined signal, which is a combination of the true data and chaff signals, that is obtained at a tap of the optical fiber.

The secured fiber system provides protection along the entire length of the optical fiber without the need for expensive guards or encasements along the optical fibers. This makes installation and security maintenance less expensive, especially for use with a long optical fiber. In addition, although encryption may be employed for the true signal, there is no need to do so. Advantageously, not employing encryption increases the bandwidth available for transmitting data which is often otherwise consumed by the data encryption.

It should be noted that only two terminals 110 and two optical fibers 150 are shown in FIG. 1 merely for simplicity purposes and without limitation on the disclosed embodiments. Additional terminals and/or optical fibers may be utilized without departing from the scope of the disclosure. Wavelength-division multiplexing may also be used both for data signals and chaff signals as needed, as long as each data signal to be protected is accompanied by one or more co-propagating chaff signals preferably occupying at least essentially the same wavelength range as the data signal.

FIG. 2A shows illustrative chaff source 200-A implemented according to an embodiment. In this embodiment, the chaff source includes an optical amplifier (OA) 210 and operates as an amplified spontaneous emission (ASE) generator. The OA 210 may be, for example, any of 1) a semiconductor amplifier, 2) a Raman amplifier, 3) a doped fiber optic amplifier, e.g. an Erbium doped amplifier, with no signal source as an input, and 4) the like. The spontaneous emission from the OA 210 may be amplified to a high intensity.

FIG. 2B shows illustrative chaff source 200-B implemented according to another embodiment. In this embodiment, chaff source 200-B includes an optional optical filter 220 coupled to OA 225. Optical filter 220 is located at the output stage of chaff generator 200-B to flatten and limit the spectrum over a predefined frequency band. As shown in the illustrative ASE spectrum 310 of FIG. 3, optical filter 225 flattens the output of chaff source 200-B to at least cover data signal spectrum 320.

Figure 2C:
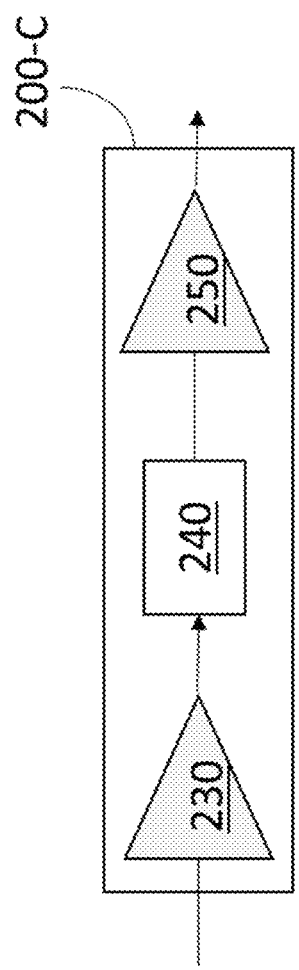
Figure 3:
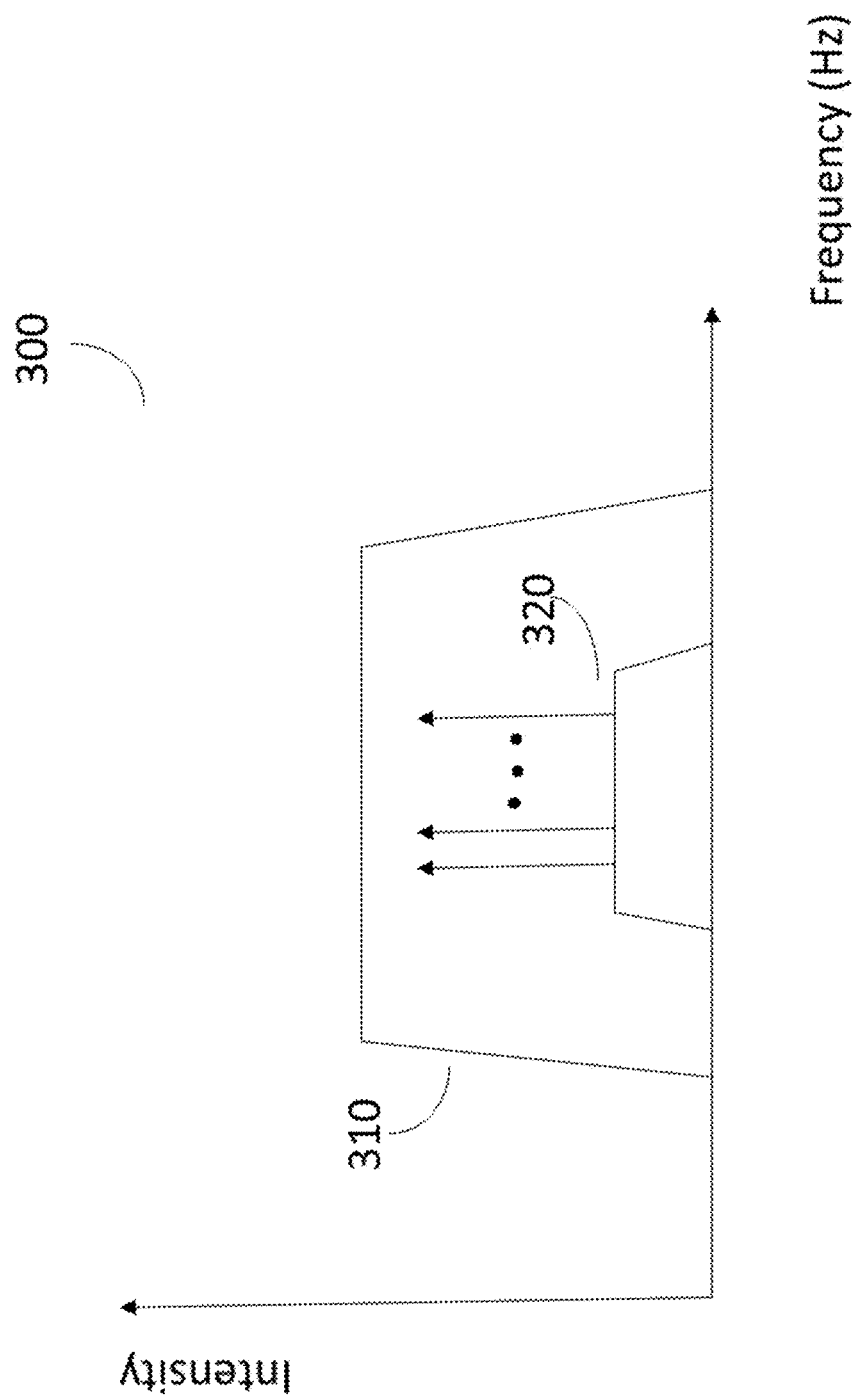
FIG. 3 is an illustrative plot of the spectrum of the ASE source with optional filter as compared to the spectrum of the data channels according to an embodiment.

FIG. 2C shows illustrative chaff source 200-C implemented according to another embodiment. In this embodiment, first optical amplifier 230 is coupled to optical filter 240 which is coupled to second optical amplifier 250. Optical amplifier 250 is the output stage of chaff generator 200-C and is utilized to amplify the output signal, i.e., the chaff signal, received from optical filter 240.

Figure 2D:
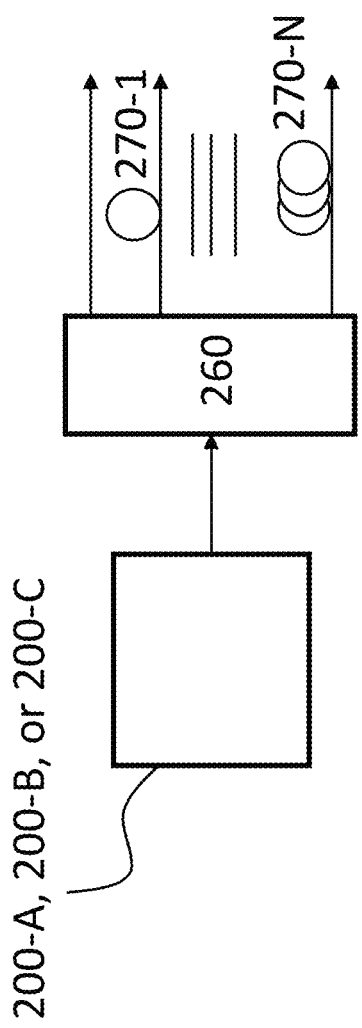
FIG. 2D shows an illustrative embodiment of a chaff generator using copies of a chaff signal and optional delay lines.

A separate chaff source, such as those shown in FIGS. 2A-2C, may be used within chaff generator 140 to generate each of the chaff signals that are supplied therefrom. Alternatively, the output of a master chaff source, which may be one of chaff sources 200-A, 200-B, or 200-C, may be split, by means of splitter 260, into multiple copies to obtain the various chaff signals, as shown in FIG. 2D. These copies of the chaff signal may be delayed relative to one another using, e.g., optical fiber delay lines 270-1 through 270-N, so as to decorrelate them.

In an embodiment, the chaff signals can be made overwhelmingly strong so that the level of tapped optical energy exceeds the dynamic range of the detector in the tapper's tapping equipment. In this case, there may not be any need to structure the format of the chaff signals as their total power will simply overwhelm the tapping equipment.

The OSNR of the data channel seen by the intended recipient at one of receivers 130 is essentially not degraded by the presence of chaff signals in other cores of the multicore fiber so long as there is essentially no leakage into the core carrying the data channel. The OSNR seen by the intended recipient is given by the ratio of the signal intensity detected in the data channel to the total noise power detected $$OSNR = \frac{P_{signal,Rx}}{ASE_{total}}; \quad \text{Equation 1}$$

where $P_{signal,Rx}$ is the signal power received from the terminal equipment and $ASE_{total}$ is the total amplified spontaneous emission power generated over the link and detected at the receiver. The two quantities are inversely related, the higher the OSNR the lower the BER and vice versa. For each data format, there is a threshold BER above which the signal information cannot be extracted. The purpose of the chaff in combination with the multicore fiber is to make sure that the BER seen at a tap at any location along the optical fiber is above this threshold.

In an embodiment, a monitoring signal from one of OTDRs 151 is combined, e.g., multiplexed with at least one of the chaff signals prior to the chaff signal being supplied to a core of optical fiber 150 when optical fiber 150 is a multicore fiber. Thus, a combined OTDR and chaff signal is supplied to at least one core of one of the multicore fibers 150. The OTDR signal may be used to detect tampering with the cable, such as a tap and the location thereof, either by reflection of the signal back to the one of OTDRs 151 that generated it or by being received by an OTDR or similar detector at the opposite end of the optical fiber.

Figure 4:
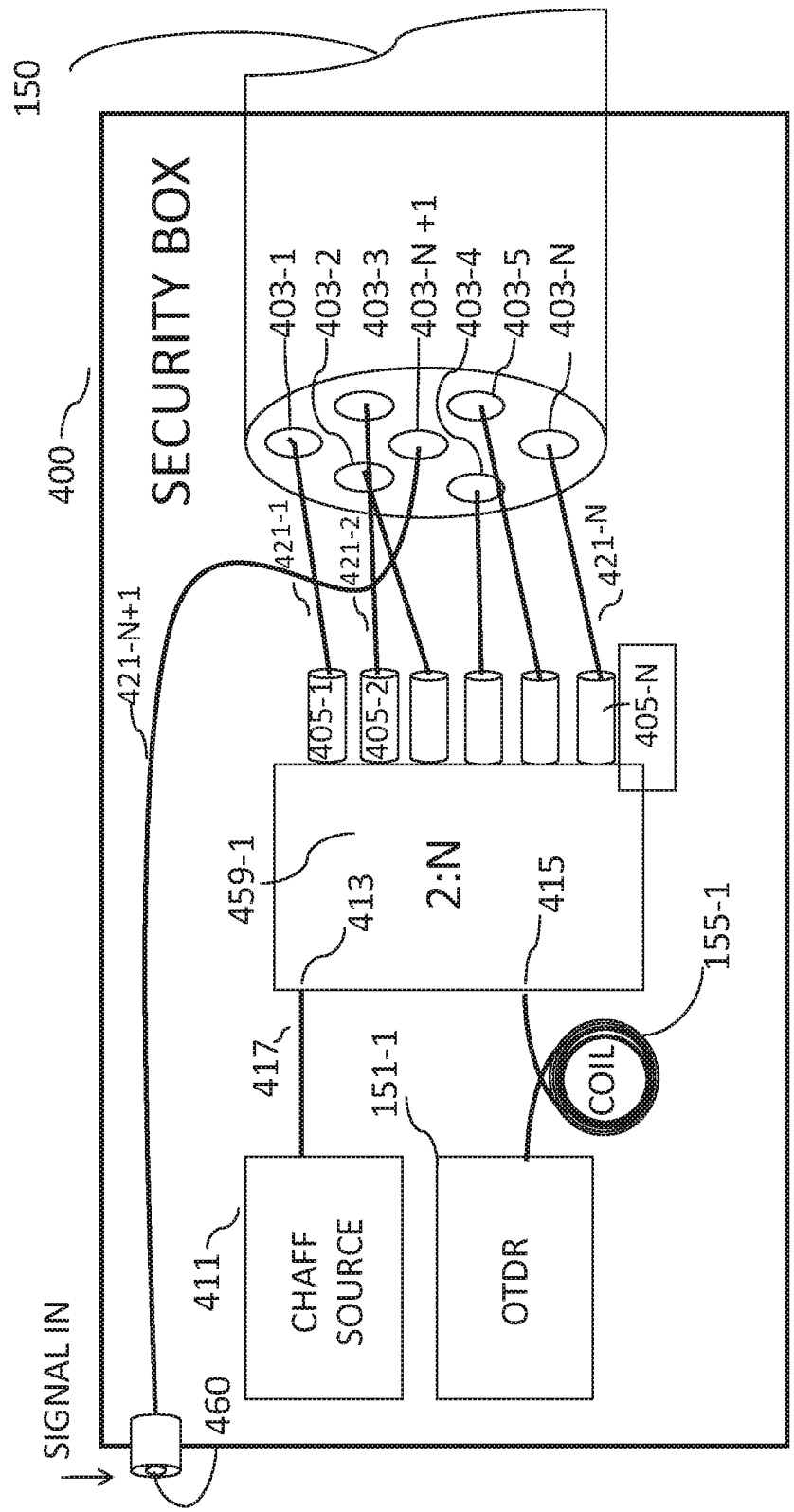
FIG. 4 shows an illustrative embodiment in which a terminal is contained in which within a secure box.

FIG. 4 shows an illustrative embodiment of the disclosure in which an embodiment of a terminal, e.g., terminal 110-1 (FIG. 1), is contained within secure box 400. In the embodiment of FIG. 4 the true data signal is supplied to input 460 as an optical signal.

In FIG. 4 an optical chaff signal is generated by chaff source 411, e.g., which may include one of chaff generators 200 (FIG. 2). The optical chaff signal is supplied as an output from chaff source 411, e.g., via fiber 417, and is coupled to a first port 413 of 2:N optical coupler 459-1, where N is an integer equal to or greater than 1, although often N will be greater than 1.

A monitoring signal 407 from an OTDR, e.g., OTDR 151-1, such as may be supplied from transmitter 121-N (FIG. 1), is coupled to second port 415 of 2:N optical coupler 459-1, e.g., via launch fiber 157-1, which may be arranged as a fiber coil. For the sake of clarity, the transmitter, receiver and signal processor, and coupler which may be included in OTDR 151-1 as shown in FIG. 1 are not shown in FIG. 4. 2:N optical coupler 459-1 combines the optical chaff signal and the OTDR monitoring signal and generates N copies of the combined, e.g., multiplexed, chaff and OTDR monitoring signal, each of which is provided to a respective one of each of its output ports 405-1 through 405-N.

2:N optical coupler 459-1 may be implemented using, for example, 1) fibers, 2) optical integrated circuits, 3) free space coupling, or 4) other methods as well as combinations thereof. In one embodiment of the invention 2:N optical coupler 459-1 may be constructed of a tree of 1:2 and 2:2 couplers as is known in the art. Differential delays, e.g., as shown in FIG. 2D, may be introduced in the 2:N coupler output 405-1 through 405-N before sending the decorrelated combination of OTDR and chaff signals to individual cores 403-1 through 403-N of a multi-core optical fiber. The data signal may be sent to the central core 403-N+1, e.g., as an optical signal 460 directly provided to box 400 from the outside.

At least one of the combined chaff and OTDR monitoring signals from output ports 405 is provided to at least one of cores 403, which includes cores 403-1 through 403-N, of multicore fiber 150.

Core 403-N+1 is supplied with the true data signal that is received at the input data source 460. In the embodiment as shown in FIG. 4 the received true signal is already in a suitable format for transmission via optical fiber 150, e.g., within core 403-N+1. In this regard, note, as indicated above, that there are often strong preferences or requirements, e.g., on the part of governments for highly secure government communications, that an optical data signal not be modified by a transceiver. The arrangement shown in FIG. 4 is, advantageously, particularly suitable for such applications.

The chaff signals, whether combined with the OTDR signal or not, are coupled into ones the individual channels of multicore fiber 150, e.g., using respective couplers 421-1 through 421-N. In addition, coupler 421-N+1 provides an optical path coupling input data source 460 to core 403-N+1. Such couplers may be, for example, 1) a lensed fiber-based coupler, 2) a tapered glass fiber coupler, 3) a free space bulk optics coupler, or 4) any other known or developed coupler as well as combinations thereof. The couplers may also include fiber and free space paths. Collectively these couplers amount to a transmit spatial multiplexer in that they couple a plurality of optical signals into respective ones of a plurality of spatial paths of optical fiber 150.

Although in FIG. 4 only a single true data signal is shown, in other embodiments more than one true data signal may be employed, each being supplied to its own respective one of cores 403.

Although FIG. 4 shows the use of each of the cores not being used to carry a true data signal as carrying one of combined chaff and monitoring signals 405, it is only necessary that one of the cores carry one of combined chaff and monitoring signals output from one of output ports 405. The other cores could carry other signals or nothing at all. For example, only chaff signals may be carried. In practice, the number of cores, the number of chaff and OTDR multiplexed signals, the number of true data signals, and the number of chaff only signals need not be directly related and are at the discretion of the implementer. All cores need not be used all chaff or chaff multiplexed with OTDR signals that are produced need not be used.

In accordance with an aspect of the disclosure, the known OTDR so-called "dead zone" may be arranged to be substantially contained within secure box 400. This may be achieved, in one embodiment of the disclosure, by arranging for the length of launch fiber 155-1 to be long enough so that it extends substantially for the length of the OTDR dead zone. In another embodiment of the disclosure, the length of optical fiber 150 contained within secure box 400 is arranged to substantially contain the OTDR dead zone and the length of launch fiber 155-1 and the optical path to optical fiber 150 may be relatively short. In yet a further embodiment of the disclosure, the optical path including the combined length of launch fiber 155-1, 2:N coupler 459-1, the interconnects, and optical fiber 150 within secure box 400 is arranged to be long enough so as to extend substantially the length of the OTDR dead zone. Advantageously, in accordance with this aspect of the disclosure, the portion of optical fiber 150 that extends beyond secure box 400 falls with the zone that can be monitored for tampering by OTDR 151. Thus, the OTDR signal may be used to detect tampering such as a bend or tap and, e.g., the location thereof, at any point along substantially the entire portion of optical fiber 150 that is external to secure box 400 while those portions of the link from OTDR 151 to the exit point of optical fiber 150 that cannot be monitored by OTDR 151 because they are within the dead zone are safely within secure box 400 and so cannot be tampered with or otherwise tapped.

In embodiments of the disclosure, the length of the fiber length within secure box 400 may range from 10 meters to 100 meters so that the entire dead zone of OTDR 151 is contained within secure box 400.

In one embodiment of the disclosure, secure box 400 may be a secure enclosure that conforms to Committee on National Security Systems (CNSSI) 7003 for Protected Distribution Systems (PDS).

In an embodiment of the disclosure, instead of using 2:N coupler 459-1 separate fiber couplers, e.g., 1:2 and 2:2 fiber couplers, may be used to couple at least one of respective ones of individual chaff signals with an OTDR monitoring signal. Each of the individual chaff signals may be separately generated or they may be copies of a single chaff signal, e.g., through the use of a 1:M coupler, M being an integer greater than or equal to 2, or a combination of such approaches, e.g., one or more individually generated and at least two that are copies produced by a coupler.

In another embodiment, 2:N coupler 459-1 may be a device configured such as to supply the OTDR signal multiplexed with the chaff signal to different ones of outputs 405 at different times. For example, the OTDR signal may be multiplexed with the chaff signal so as to supply the combined signal to one of cores 403-1 to 403-N on a round robin basis.

The OSNR seen by a tapper tapping into the optical fiber is given by:

$$OSNR_{tap} = \frac{\alpha_{signal}\rho_{signal}P_{signal,Tx}}{\alpha_{chaff}\rho_{chaff}ASE_{chaff}}; \quad \text{Equation 2}$$

where $\alpha_{signal}$ and $\alpha_{chaff}$ are the attenuations suffered by the data signal and chaff respectively between the terminal equipment and the position at which the optical fiber was tapped. $\rho_{signal}$ and $\rho_{chaff}$ are the out-coupling coefficients for the signal and chaff at the tap location. $P_{signal,Tx}$ is the signal power transmitted from the terminal equipment and $ASE_{chaff}$ is the power in the chaff signal generated at the terminal equipment.

As discussed above, the secured optical fiber system may utilize multicore optical fibers. Such a fiber is arranged to have a set of cores that extend in parallel along the length of the multicore fiber. An optical signal may propagate independently in each core. The cores may be sized so as to correspond to single mode, few mode, and multimode fibers. The multicore fiber thus allows for the use of spatial division multiplexing as well as wavelength division multiplexing and time division multiplexing.

Multicore fibers can be made with a variety of core geometries including, but not limited to, concentric refractive index layers in a fiber creating concentric cores as well as individual cores arranged in a variety of cross sectional configurations. These configurations include, but are not limited to: linear, circular, hexagonal, rectangular, and the like.

The individual cores of a multicore fiber used in the secured fiber link system can be identical to each other or can be different from one another. In various embodiments, one or more of the cores may be bend sensitive while one or more of the cores may be bend insensitive. Bend insensitive cores may be made using refractive index trenches or rings of air-cores surrounding the signal carrying core that will limit the amount of light that can escape the fiber when it is bent.

In an embodiment, a center core of a multicore fiber carries the true signal and is a bend sensitive core while the one or more outer cores, at least one of which is carrying a chaff and at least one OTDR signal, are of the bend insensitive type. Upon tapping by a tapper, the energy in the signal channel will drop and is detectable by an OTDR at at least one of the terminals at the ends of the link. The location of the tap may also be detected. In a similar embodiment, if there are M cores, M≥1, carrying a desired signal and N cores carrying chaff, N≥1, where at least one of the cores carrying chaff also carries an OTDR signal, in the multicore fiber, so that the total cores in the multicore fiber is ≥M+N, then the M signal cores may be of the bend sensitive type and the N chaff cores may be of the bend insensitive type.

In another embodiment, the center core of the multicore fiber, which is carrying the true signal, is bend insensitive and any outer cores carrying a chaff signal, at least one of which also carries an OTDR signal, are of the bend sensitive type. This will improve the OSNR advantage of the secured fiber link system when tapped by a tapper as more energy leaks out of the chaff cores than the true signal core. In a similar embodiment, if in the multicore fiber there are M cores, M≥1, carrying a true signal and N cores, N≥1, carrying a chaff signal, at least one of the cores carrying a chaff signal also carrying an OTDR signal, such that the total number of cores in the multicore fiber is ≥M+N, then the M true signal carrying cores can be of the bend insensitive type and the N cores carrying chaff can be of the bend sensitive type.

Preferably the chaff signals are uncorrelated with the true data signal and have a bandwidth at least as wide as that used for the data signals being transmitted over the fiber link. The chaff signals should also be of sufficient strength to reduce the OSNR or equivalently raise the BER for a tapper tapping the fiber link.

In other embodiments, in lieu of a multicore fiber, any transmission medium in which multiple, independent information bearing optical signals can propagate simultaneously may be employed, e.g., few mode fibers and multimode fibers, so that spatial division multiplexing technology is employed.

Therefore, if the anti-tapping system is utilized according to various disclosed embodiments, then the resulting protection will be the same regardless of how a tapper applies their fiber bending or stretching mechanism. For the current secured system, it is assumed that the chaff and true signal channels can each be coupled selectively into the chaff and true signal channels of the fiber at the transmitter end and selectively coupled out at the other end (receiver) of the link with an appropriate coupler. Such couplers include lensed fiber based couplers, tapered glass fiber couplers, polymer based couplers, and free space bulk optics couplers.

In a typical embodiment, the optical fiber medium should have properties that both maximize the effectiveness of the anti-tapping capability of the system and do not inhibit the legitimate information transfer between system users: The relevant properties of the fiber are out-coupling efficiency (dB) of the true and chaff channels via bending or stretching, attenuation of the chaff and true signal channels (dB/m) along the fiber link, and cross-talk between the chaff and true signal channels (dB). The various disclosed embodiments include involves the relative out-coupling of the chaff signal(s) energy as compared to the true signal(s) energy at the point of tapping along the link and the corresponding impact on the OSNR as seen by a tapper. The strength of the true and chaff signal(s) depends on the strength of the corresponding sources, the attenuation of the signals in the fiber from the source to the point along the fiber link where the tapping occurs and the out-coupling efficiency for each signal at the point of tapping. The essential point is that the total chaff energy extracted by a tapper from the fiber link at the point of tapping should be sufficiently strong compared to the true signal energy such that the OSNR observed by the tapper is sufficiently low so that the bit error rate will be sufficiently high to prevent the tapper from extracting useful information from the true signal. Simultaneously the OSNR observed by each intended receiver, e.g., one of receivers 130-1 or 130-2, to which a true signal is legitimately coupled should be sufficiently high so that the intended receiver can extract all information from the true signal.

If the crosstalk, $\gamma(dB/m)$ being the crosstalk per unit length of fiber between chaff and true signal channels, is significant then this can severely limit the data transfer along the legitimate signal channel. It may also be easier to tap the fiber as both signal and chaff channels will contain signal information.

Preferably crosstalk in the fiber between the true data signal and chaff channels, some of which may be carrying an OTDR signal should be minimized.

In an embodiment, station reflectors may be used at the terminations of the multicore fiber cores that carry the chaff signals so that generated chaff generated signal at the central office can be "reused" in the cable. This may negate the need for to generate a chaff signal at the recipient's premises, reducing the equipment needed at the customer's premises. This may be advantageous for fiber-to-the-home, where this embodiment minimizes the equipment required at the customer's home. This aids the network management in that all chaff signal generation can be at the central office making repairs easier and less invasive to a home customer. A reflector can be placed at the end of the multicore fiber link that only reflects the chaff channels and does not reflect the true signal core. An alternative is to use a multichannel fanout coupler and then to terminate the individual chaff fanout channels with connectors that have a reflector on them that will reflect the amplified spontaneous emission energy back through the multichannel fanout coupler and back into the multicore fiber. The signal channel(s) will not be terminated with a reflector. Such reflectors may be considered to be an implementation of a chaff generator, e.g., one of chaff generators 140.

In an embodiment, one or more of the non-true-signal carrying cores can be used to carry light that will be used to transmit power from the central office to the receive station where a photocell will convert the optical energy into electrical energy that can be used to run the receive station or be stored in a battery if one is used at the receiver. This will enable a functionality such as was provided by the telephone system that was in place for many years in which a wired telephone was powered without requiring power from the local power utility. Optionally, chaff re-use modules 141 may be employed in this context to convert such received light, which may be in the form of received chaff signals with or without OTDR signals multiplexed therewith, to power. Thus, at the implementers discretion, chaff re-use modules 141 may reuse the chaff signals in the form of power, as chaff signals as described hereinabove, or in a combination power and chaff signals. In the even that insufficient power is generated by a chaff re-use module 141 that contains a photocell and is generating power from chaff signals to entirely power a terminal 110, the power required to power the terminal 110 may simply be reduced by the amount of power generated from converting the chaff signals. Note that, if there is no implementation of the functionality provided by wavelength multiplexer 181, e.g., no reuse of the received chaff signals as chaff signals, the chaff signals multiplexed with OTDR signals may be provided directly to a chaff reuse module 141 for conversion to electrical power.

Although shown in the illustrative embodiment of FIG. 1 as two separate cables optical fibers 150-1 and 150-2, in an embodiment only a single optical fiber may be employed while achieving bidirectional transmission. For example, one or more of the cores of the single optical fiber could be employed for transmitting a true signal in one direction while others of the cores of the single optical fiber could be employed for transmitting a true signal in the opposite direction. Ones of the remaining cores of the single optical fiber may be employed for carrying chaff signals, one or more of which may be multiplexed with a signal for use by an OTDR.

It should be noted that the disclosed embodiments may be utilized in conjunction with existing or future arrangements for preventing tapping or other tampering with optical fibers. Thus, other measures for protecting transmitted data, such as data encryption, patrolling of data lines by guards, intrusion detection monitor sensors, and hardening of data lines by encasing them in concrete or steel conduits may be employed in addition to the techniques disclosed herein. However, use of the disclosed embodiments may reduce or eliminate the need for some or all of those measures.

Any electronics required for the various embodiments disclosed herein, e.g., for the OTDR or to process received signals, can be implemented hardware or as a combination of firmware and/or software running on hardware. Moreover, the software may be implemented as a program tangibly embodied on a program storage unit or computer readable medium. The program may be uploaded to, and executed by, a machine comprising any suitable architecture. A computer platform having hardware such as one or more central processing units ("CPUs"), a memory, and input/output interfaces may be suitably employed. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A system for securing communication over an optical fiber, comprising:
   transmit spatial multiplexer configured to couple ones of a plurality of optical signals into ones of a plurality of spatial paths of an optical fiber, each of the spatial paths being able to carry an optical signal; and
   a secure housing;
   wherein at least a first one of the plurality of optical signals is an optically modulated version of a desired sequence of information that is intended to be transferred over the optical fiber, the at least first one of the plurality of optical signals being coupled into a first one of the plurality of spatial paths;
   wherein at least a second one of the plurality of optical signals is an optical chaff signal, the at least second one of the plurality of optical signals being coupled into a second one of the plurality of spatial paths different from the first one;
   wherein at least a third one of the plurality of optical signals is an optical signal for use by an optical time domain reflectometer (OTDR); and
   wherein the secure housing contains:
   the transmit spatial multiplexer;
   a chaff signal generator, the chaff signal generator being configured to generate the chaff signal so that the chaff signal occupies substantially a same bandwidth as the optically modulated version of the desired sequence of information;
   the optical time domain reflectometer which generates the optical signal for its use and is configured to detect a change to the condition of the optical fiber with respect to an earlier condition of the optical fiber; and
   a launch fiber coupled at a first end thereof to the optical time domain reflectometer;
   whereby a tap along the fiber cannot determine the transmitted desired sequence of information.

2. The system of claim 1, wherein the optical signal for use by the OTDR is wavelength multiplexed with the optical chaff signal and coupled therewith by the spatial multiplexer onto the second spatial path.

3. The system of claim 1, wherein the optical signal for use by the OTDR is supplied to a third one of the plurality of spatial paths different from the first and second ones.

4. The system of claim 1, wherein the optical fiber is a multi-core fiber and wherein the first one of the plurality of spatial paths is a first core of the multi-core fiber and the second one of the plurality of spatial paths is a second core of said multi-core fiber.

5. The system of claim 4, wherein the at least one optical signal for use by an OTDR is coupled to a third core of said multi-core fiber.

6. The system of claim 4, wherein the optical signal for use by the OTDR is wavelength multiplexed with at least one of the first and second optical signals and coupled at least to the same core as the at least one of the first and second optical signals with which it is multiplexed.

7. The system of claim 1, wherein the optical signal for use by the optical time domain reflectometer is at a frequency different from that of the chaff signal.

8. The system of claim 1, wherein the system further comprises:
 an optical coupler for coupling the chaff signal and the optical signal for use by the optical time domain reflectometer together; and
 an optical filter coupled to the spatial path to which the chaff signal and signal for use by the optical time domain reflectometer are coupled to block reflections of the chaff signal that are received hack at the transmit spatial multiplexer.

9. The system of claim 1, wherein the launch fiber is coupled at a second end thereof to an optical path supplying the optical signal for use by the OTDR to the spatial multiplexer.

10. The system of claim 1, wherein a length of an optical path traveled within the secure housing by the optical signal for use by the OTDR is of sufficient length to prevent an OTDR dead zone at a point that the optical signal for use by the OTDR exits the secure housing.

11. The system of claim 10, wherein the length of the optical path traveled within the secure housing by the optical signal for use by the OTDR is determined as a function of at least one of the group consisting of: the length of the optical fiber and the power of the optical signal for use by the OTDR.

12. The system of claim 10, wherein the length of the optical path traveled within the secure housing by the optical signal for use by the OTDR is substantially equal to the length of the launch fiber.

13. The system of claim 1, further comprising within the secure housing:
 an optical coupler for coupling the chaff signal and the optical signal for use by an optical time domain reflectometer together; and
 an optical filter coupled to the launch fiber to block reflections of the chaff signal from being received by the optical time domain reflectometer.

14. The system of claim 1, further comprising a photocell located at an end of the optical fiber remote from the transmit spatial multiplexer, the photodetector being coupled to receive the optical chaff signal and convert it into electrical energy.

15. The system of claim 14 wherein the electrical energy is used to at least partially power a receiver coupled to the optical fiber at the remote end.

16. A method for securing information transmitted over an optical fiber having a plurality of spatial paths, comprising:
 coupling each of a set of optical signals into at least one of the plurality of spatial paths;
 wherein at least one of the set of optical signals is an optically modulated version of a desired sequence of information that is intended to be transferred over the optical fiber, the at least first one of the plurality of optical signals being coupled into a first one of the plurality of spatial paths;
 wherein at least a second one of the set of optical signals is an optical chaff signal, the at least second one of the plurality of optical signals being coupled into a second one of the plurality of spatial paths different from the first one; and
 wherein at least a third one of the plurality of optical signals is an optical signal for use by an optical time domain reflectometer (OTDR); and
 wherein optical power of the at least one optical chaff signal when coupled to its optical path is such that at a tap at any point along the optical fiber a signal representing the optically modulated version of the desired sequence of information that is sufficiently strong to enable determination therefrom of the desired sequence of information cannot be obtained due to interference caused by the resultant presence of the optical chaff signal at the tap point.

17. The system of claim 16 wherein the optical signal for use by the OTDR is wavelength multiplexed with the optical chaff signal and coupled therewith onto the second one of the plurality of spatial paths.

18. The system of claim 16, wherein the optical signal for use by the OTDR is wavelength multiplexed with the optical signal carrying a desired sequence of information and coupled therewith by the spatial multiplexer onto the first one of the plurality of spatial paths.

19. The method of claim 16, wherein the at least one optical chaff signal occupies an optical frequency range that is substantially the same as an optical frequency range occupied by the optically modulated version of the desired sequence of information.

20. The method of claim 16, further comprising:
 operating an optical amplifier to generate the at least one optical chaff signal by amplifying spontaneous emission.

21. The method of claim 16, further comprising:
 determining, at an end of the fiber at which the coupling, is performed, if there is a tap on the optical fiber based on returned optical energy of the optical signal for use by the OTDR.

22. The method of claim 16, further comprising:
 when a tap of the optical fiber is detected, determining, at an end of the fiber at which the coupling is performed, the location of the tap based on returned optical energy of the optical signal for use by the OTDR.

23. The method of claim 16, further comprising:
 determining, at an opposite end of the fiber from that at which the coupling is performed, if there is a tap on the optical fiber based on energy of the optical signal for use by an OTDR received at the end of the optical fiber opposite to that at which the coupling is performed.

24. The method of claim 16, further comprising:
 when a tap of the optical fiber is detected, determining, at an end of the optical fiber opposite to that at which the coupling is performed, the location of the tap based on energy of the optical signal for use by an OTDR received at the opposite end of the fiber.

25. A terminal equipment for securing communication over an optical fiber, comprising:
 a transmit spatial multiplexer configured to couple a plurality of optical signals into respective ones of a plurality of spatial paths of an optical fiber, each of the spatial paths being able to carry an optical signal;
 wherein at least one of the plurality of optical signals is an optically modulated version of a desired sequence of information that is intended to be transferred over the optical fiber; and wherein at least one of the plurality of optical signals is an optical chaff signal multiplexed with an optical signal for use by an optical time domain reflectometer (OTDR);

an optical coupler for coupling the chaff signal and the optical signal for use by an optical time domain reflectometer together; and an optical filter coupled to the spatial path to which the chaff signal and signal for use by an optical time domain reflectometer are coupled to block reflections of the chaff signal that are received back at the transmit spatial multiplexer;

whereby a tap along the fiber cannot determine the transmitted desired sequence of information.

26. The terminal equipment of claim 25, wherein the optical fiber is a multi-core fiber and wherein the optically modulated version of a desired sequence of information is coupled by the transmit spatial multiplexer to a first core of the multi-core fiber and the at least one optical chaff signal multiplexed with the optical signal for use by the optical time domain reflectometer is coupled to a second core of the multi-core fiber.

27. A system for securing communication over an optical fiber, comprising:

a transmit spatial multiplexer configured to couple ones of a plurality of optical signals into ones of a plurality of spatial paths of an optical fiber, each of the spatial paths being able to carry an optical signal;

wherein at least a first one of the plurality of optical signals is an optically modulated version of a desired sequence of information that is intended to be transferred over the optical fiber, the at least first one of the plurality of optical signals being coupled into a first one of the plurality of spatial paths;

wherein at least a second one of the plurality of optical signals is an optical chaff signal, the at least second one of the plurality of optical signals being coupled into a second one of the plurality of spatial paths different from the first one; and wherein at least a third one of the plurality of optical signals is an optical signal for use by an optical time domain reflectometer (OTDR);

an optical coupler for coupling the chaff signal and the optical signal for use by an optical time domain reflectometer together; and an optical filter coupled to the spatial path to which the chaff signal and signal for use by the optical time domain reflectometer are coupled to block reflections of the chaff signal that are received back at the transmit spatial multiplexer;

whereby a tap along the fiber cannot determine the transmitted desired sequence of information.

28. The system of claim 27, further comprising a secure housing containing:

the transmit spatial multiplexer;

a chaff signal generator, the chaff signal generator being configured to generate the chaff signal so that the chaff signal occupies substantially a same bandwidth as the optically modulated version of the desired sequence of information;

the optical time domain reflectometer which generates the optical signal for its use and is configured to detect a change to the condition of the optical fiber with respect to an earlier condition of the optical fiber; and a launch fiber coupled at a first end thereof to the optical time domain reflectometer.

29. The system of claim 27, wherein the optical signal for use by the OTDR is wavelength multiplexed with the optical chaff signal and coupled therewith by the spatial multiplexer onto the second spatial path.

30. The system of claim 27, wherein the optical signal for use by the OTDR is supplied to a third one of the plurality of spatial paths different from the first and second ones.

31. The system of claim 27, wherein the optical fiber is a multi-core fiber and wherein the first one of the plurality of spatial paths is a first core of the multi-core fiber and the second one of the plurality of spatial paths is a second core of said multi-core fiber.

32. The system of claim 30, wherein the at least one optical signal for use by the OTDR is coupled to a third core of said multi-core fiber.

33. The system of claim 30, wherein the optical signal for use by the OTDR is wavelength multiplexed with at least one of the first and second optical signals and coupled at least to the same core as the at least one of the first and second optical signals with which it is multiplexed.

34. The system of claim 27, further comprising a chaff signal generator, the chaff signal generator being configured to generate the chaff signal so that the chaff signal occupies substantially a same bandwidth as the optically modulated version of the desired sequence of information.

35. The system of claim 27, wherein the optical signal for use by the optical time domain reflectometer is at a frequency different from that of the chaff signal.

36. The system of claim 27, further comprising a photocell located at an end of the optical fiber remote from the transmit spatial multiplexer, the photodetector being coupled to receive the optical chaff signal and convert it into electrical energy.

* * * * *